Figure 1:
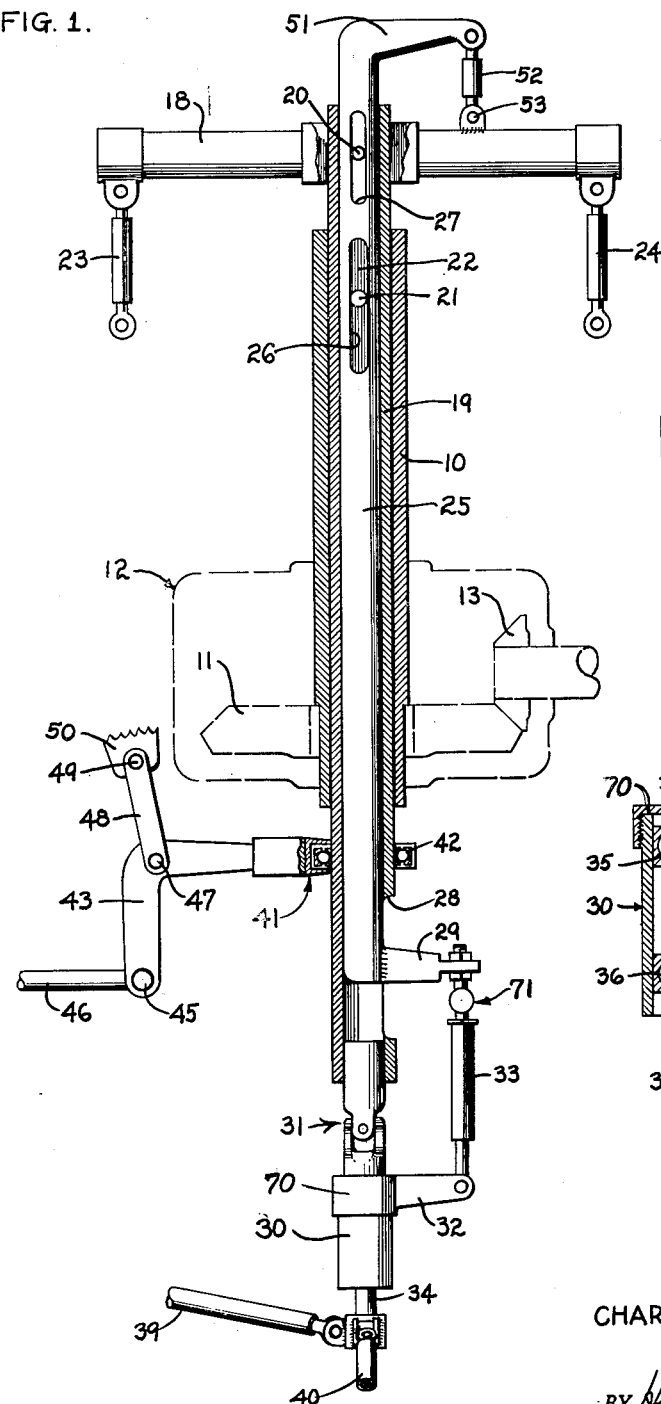

March 3, 1953 — C. M. SEIBEL — 2,630,184
CYCLIC AND COLLECTIVE PITCH CONTROL MECHANISM FOR HELICOPTER ROTORS
Filed Jan. 31, 1949 — 2 SHEETS—SHEET 1

CHARLES M. SEIBEL
INVENTOR.

BY *Hubert Miller*

March 3, 1953

C. M. SEIBEL 2,630,184

CYCLIC AND COLLECTIVE PITCH CONTROL
MECHANISM FOR HELICOPTER ROTORS

Filed Jan. 31, 1949

2 SHEETS—SHEET 2

CHARLES M. SEIBEL
*INVENTOR.*

BY Hubert Miller

Patented Mar. 3, 1953

2,630,184

UNITED STATES PATENT OFFICE 2,630,184

CYCLIC AND COLLECTIVE PITCH CONTROL MECHANISM FOR HELICOPTER ROTORS

Charles M. Seibel, Wichita, Kans., assignor, by mesne assignments, to The Cessna Aircraft Company, Wichita, Kans.

Application January 31, 1949, Serial No. 73,798

7 Claims. (Cl. 170—160.25)

1

This invention relates to rotary wing aircraft, and more particularly to a blade pitch controlling mechanism for the propelling rotors of such aircraft.

For proper flight control of such aircraft as helicopters, it has been found necessary to provide not only a means for the operator to simultaneously vary the pitch of the rotor blades in the same sense (commonly known as "collective pitch control"), but also a means of causing each blade to cyclically change from low to a higher pitch and back to low pitch once during each revolution of the rotor, the degree of change in pitch, as well as the relative position of the blade as it assumes the higher pitch, being under the direct control of the operator (commonly known as "cyclic pitch control"), thus giving the pilot lift control, lateral control, and directional control over the craft. The present invention deals with a mechanism for providing such control.

Mechanisms of this class presently in use are highly complicated in design and are very costly to produce. They include a large and heavy gimbal unit which must be mounted externally on the rotor shaft, or shaft housing. The mounting is difficult and expensive, and the external mechanism for controlling the gimbal ring from the pilot's seat is likewise heavy and costly to manufacture and assemble.

It is the chief object of this invention to provide a combination helicopter rotor drive and cyclic blade pitch control unit of highly simplified design—one which eliminates the gimbal unit entirely, and utilizes an entirely different mechanical principle to accomplish the same cyclic pitch control.

It is another object of the invention to produce a unit having the above mentioned characteristics which will weigh much less than units for the same purpose now in use, yet which is highly serviceable, and can be manufactured and sold under present economic conditions at approximately half the selling price of the cheapest of such units now offered for sale.

A more specific object of the invention is to provide a unit of the type mentioned which employs a single rigid member reciprocable inside the rotor drive shaft, in response to pilot control, for transmitting cyclic pitch movement to the rotor blades.

The details in the construction of one type of unit embodying the invention, together with other objects attending its production, will be more clearly understood when the following description is read in connection with the accompanying drawings, in which:

2

Figure 2:
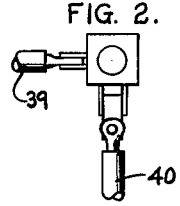
Figure 3:
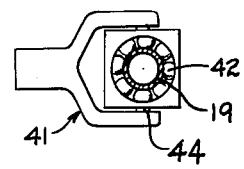
Figure 4:
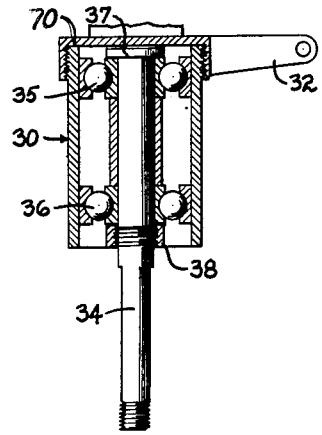

Fig. 1 is a schematic side elevation of a mechanism embodying the invention, certain parts being shown in section and others shown fragmentarily; Fig. 2 is an enlarged plan view of a fitting shown at the lower end of Fig. 1; Fig. 3 is an enlarged plan view of a yoke shown in vertical section in Fig. 1; Fig. 4 is an enlarged side elevation or a portion of the Fig. 1 mechanism, with parts in section; and Fig. 5 is an enlarged perspective view of the upper end of the mechanism shown in Fig. 1, and illustrates the manner of connecting the mechanism to the rotor blades, the blades being shown fragmentarily.

It should be noted that Fig. 1 of the drawings shows the lateral dimensions much greater in proportion to the longitudinal dimensions than the proportions existing in the actual unit. This was done for the sake of clarity only.

Referring to Fig. 1, the rotor mast is in the form of a hollow shaft 10 which is supported on the aircraft in upright position by members not shown, and is caused to rotate by means of a gear 11 which would normally be housed in a transmission box 12, and caused to rotate by means of a meshing gear 13 driven in a conventional manner by the power plant of the aircraft.

Figure 5:
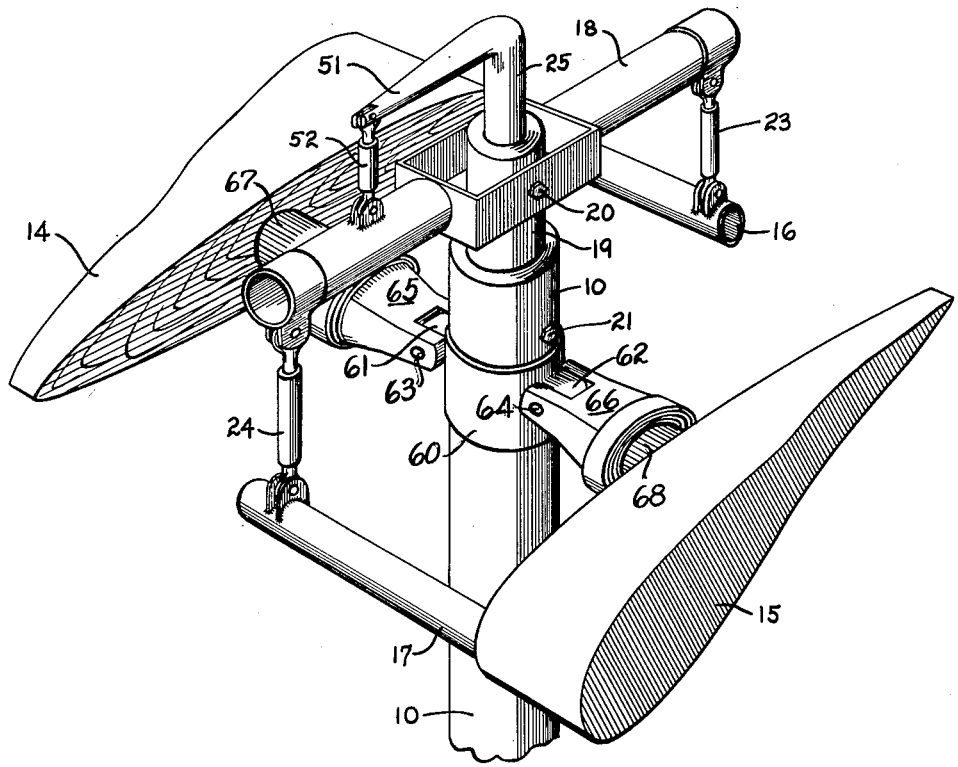

A collar 60 is welded or otherwise rigidly secured on mast 10 near its upper end (Fig. 5). The collar carries integral oppositely positioned lugs 61 and 62, having transverse apertures to receive pivot pins 63 and 64 which pivotally anchor the bifurcated inner ends of blade axis sockets 65 and 66. These sockets receive and journal spanwise shafts 67 and 68 fixed to the root ends of rotor blades 14 and 15. This manner of mounting the blades on the mast permits coning movement of the blades about the horizontal pins 63 and 64, as well as pitch changing movement about the spanwise blade axes 67 and 68. Pitch changing horns 16 and 17 are provided at the inner or root ends of the respective blades.

A cross arm 18 serves to transmit pitch changing motion to the horns 16 and 17. This cross arm is pivotally mounted on a push-pull tube which will hereinafter be called the collective pitch tube 19. As will be clearly seen the pivotal axis 20 of the cross arm 18 is above and parallel to the pitch change axes of the rotor blades. The collective pitch tube is locked to rotate with the rotor mast 10 by means of a cross pin 21 passing through both these members, but the tube is free to move in either direction axially due to aligned slots 22 in the wall of the tube 19. The outer ends of the cross arm 18 are pivotally connected to links, 23 and 24, the other ends of which are pivotally connected to the respective blade horns 16 and 17.

With such an arrangement it will be plainly seen that upward movement of the collective pitch tube 19 will cause a simultaneous increase in the pitch of both blades, and the pitch change will be of the same degree. Downward movement of the tube, naturally, causes a like simultaneous decrease in the pitch of the blades.

A second push-pull member 25 serves to transmit cyclic pitch changing motion to the blades, also through the cross arm 18. The member 25 is mounted for lengthwise or axial motion inside the tube 19. To permit this motion, the member 25 is provided with a vertically elongated transverse slot 26 which slidably receives the cross pin 21, and a second vertically elongated transverse slot 27, which slidably receives the cross pin 20. The cross pin 20 thus not only serves as a pivotal axis for the cross arm 18, but also serves to force the member 25 to rotate with the collective pitch tube 19. The cross pin 21 serves as a double lock, and forces both the member 25 and the collective pitch tube 19 to rotate with the rotor mast 10.

The upper end of the member 25 is provided with a rigidly attached or integral arm 51. The outer end of this arm is pivotally connected to one end of a link 52, the other end of which is pivotally connected at 53 to cross arm 18 at a point intermediate one end of the cross arm and its own pivot point. Thus vertical movement of the member 25 causes cross arm 18 to pivot about its axis 20 in one direction or the other.

Referring to Fig. 1, it will be seen that the collective pitch control tube 19 projects beyond the lower end of the mast 10, and is provided with an axially elongated slot 28, which affords free relative longitudinal movement for a laterally projecting arm 29, which is fixed rigidly to the push-pull member 25. The extreme lower end of the tube 19 is connected to the upper end of a sleeve 30 by means of a conventional universal joint 31, which forces the sleeve to rotate with the tube 19, whether or not the two are in axial alignment.

The sleeve 30 has a cap 70 rigidly secured on its upper end, and cap 70 has an integral laterally projecting arm 32, similar to the arm 29. The outer ends of these two arms are respectively pivotally connected to the opposite ends of a link 33 which serves to transmit reciprocating motion, as desired, to the push-pull member 25 during rotation of the entire assembly, as will be hereinafter explained more fully. The pivotal connection between arm 29 and link 33 is in the form of a suitable universal joint 71, in this case shown as a ball joint. As disclosed in the drawing, the sleeve is rotatably mounted on the upper end of a rigid control rod 34 by means of suitable bearings 35 and 36, relative longitudinal movement between the rod 34 and the sleeve 30 being prevented by the shoulder 37 and the nut 38.

At its free lower end the control rod 34 is pivotally connected to a rigid fore and aft cyclic pitch control rod 39, and to a transverse cyclic pitch control rod 40, the movement of both these rods being under the direct control of the pilot by conventional means well known to those familiar with this art. Suffice it to say that these two rods, 39 and 40, are cooperatively capable of moving and holding the lower end of the control rod 34 in any desired position of non-alignment with relation to the member 25, the application of force occurring in a substantially horizontal plane.

As a means of moving the collective pitch control tube 19 upward or downward, as desired, a yoke designated as a whole by the numeral 41 is provided. A bearing 42, carried by the yoke, journals the tube 19 just above the slot 28. The inner half of the bearing is rigidly secured to the tube 19 to prevent endwise movement of the yoke on the tube. A bell crank 43 has one arm pivotally connected to the yoke at 44, and its other arm pivotally connected at 45 to a collective pitch control rod 46, which is also under direct control of the pilot. The bell crank itself has a floating pivot axis 47 which is connected to one end of a link 48, the other end of which is pivotally connected at 49 to adjacent aircraft structure 50.

*Operation*

Collective pitch change of the rotor blades is effected by pilot movement of the control rod 46. Such motion causes bell crank 43 to pivot about its axis 47, thus transmitting upward or downward motion to the yoke 41, and to the collective pitch control tube 19. Vertical movement of the tube 19 causes the cross arm 18 to be raised or lowered, as the case may be, which in turn causes the blade pitch of both rotor blades to be increased or decreased simultaneously, and in the same amount.

Cyclic pitch change of the blades is effected by pilot movement of either the control rod 39 or the control rod 40, or both simultaneously, resulting in a movement of the rod 34 to a position out of axial alignment with the member 25. The amount and rotational position of a blade pitch variation will be determined by the magnitude and direction of the displacement of the rod 34.

Considering that the mast 10, the tube 19, the member 25, the cross arm 18, the sleeve 30 and its arm 32, and the rotor blades 14 and 15 are all rotating together, it will be apparent that a displacement of the lower end of the rod 34 to the right in Fig. 1 will result in the sleeve arm 32 forcing the link 33 upward. The link will force the arm 29 and the member 25 upward. This movement is transmitted through arm 51 and link 52 to the cross arm 18, forcing the right hand end of that arm upward also. This tilting of the cross arm causes blade horn 17 (Fig. 5) to be moved upward increasing the pitch of its blade 15, and simultaneously causes the blade horn 16 to move downward decreasing the pitch of its blade, 14.

To those familiar with the art it will be understood that with the control rod 34 held in the position of non-alignment assumed (to the right in Fig. 1), the sleeve arm 32 will rotate in a plane which slopes upward on the right and downward on the left—in other words a plane which is substantially normal to the axis of rotation of the sleeve 30.

Thus when the entire assembly including the rotor and the arm 32 has rotated 180° from the assumed position, the arm 32 will have forced the member 25 to move downward with relation to the tube 19, and the arm 51, through the link 52, will have forced the cross arm 18 to tilt in the opposite direction. This movement causes an increase in the pitch of the blade 14, and a decrease in pitch of the blade 15. Since the member 25 is forced to reciprocate as the various elements rotate, this reciprocation produces a cyclic variation in the pitch of the rotor blades which is substantially sinusoidal in character, and of a frequency of once per revolution. As stated previously, the degree of pitch variation and the rotational position in which the high and low pitch conditions occur are determined by the pilot through his control over the magnitude and direction of movement of the rod 34. Such cyclic pitch control by the pilot gives him direct control of the direction of flight of the craft, as well as control of the craft about its longitudinal and lateral axes.

From the above description it will be seen that the invention provides a highly simplified unit for controlling both the collective pitch variation and the cyclic pitch variation of the rotating blades of a helicopter rotor. It will be understood that the mechanical principle employed can be applied to a rotor arrangement having 1, 2, 3, or more blades.

Having described the invention with sufficient clarity to enable those familiar with the art to construct and use it, I claim:

1. In a helicopter, a hollow drive shaft; rotor blades; means mounting said blades on said shaft to rotate therewith and including a spanwise pivot axis for each blade affording pitch changing blade movement; a push-pull tube reciprocable within the hollow drive shaft and locked to rotate therewith; a rigid cross arm centrally pivoted on said push-pull tube on an axis normal to the rotational axis of the tube; links pivotally connecting the opposite ends of said cross arm to the respective blades for effecting simultaneous blade pitch changing motion in the same sense in response to longitudinal movement of said push-pull tube; a second push-pull member reciprocable within the push-pull tube and locked to rotate therewith; a rigid arm extending laterally from said second push-pull member; a link pivotally connecting the outer end of said arm to said cross arm at a point between one end of the cross arm and its pivot axis for effecting simultaneous blade pitch changing motion in an opposite sense in response to longitudinal movement of said second push-pull member within the push-pull tube; and pilot controlled means for moving each push-pull member longitudinally with relation to said drive shaft during the rotation of all three.

2. In a helicopter, a hollow drive shaft; rotor blades; means mounting said blades on said shaft to rotate therewith and including a spanwise pivot axis for each blade affording pitch changing blade movement; a push-pull tube reciprocable within the hollow drive shaft and locked to rotate therewith; a rigid cross arm centrally pivoted on said push-pull tube on an axis normal to the rotational axis of the tube; links pivotally connecting the opposite ends of said cross arm to the respective blades for effecting simultaneous blade pitch changing motion in the same sense in response to longitudinal movement of said push-pull tube; a second push-pull member reciprocable within the push-pull tube and locked to rotate therewith; a rigid arm extending laterally from said second push-pull member; a link pivotally connecting the outer end of said arm to said cross arm at a point between one end of the cross arm and its pivot axis for effecting simultaneous blade pitch changing motion in an opposite sense in response to longitudinal movement of said second push-pull member within the push-pull tube; and pilot controlled means operably connected to said second push-pull member for reciprocating it with relation to the push-pull tube during their rotation with the drive shaft.

3. In a helicopter, a hollow drive shaft; rotor blades; means mounting said blades on said shaft to rotate therewith and including a spanwise pivot axis for each blade affording pitch changing blade movement; a push-pull tube reciprocable within the hollow drive shaft and locked to rotate therewith; a rigid cross arm centrally pivoted on said push-pull tube on an axis normal to the rotational axis of the tube; links pivotally connecting the opposite ends of said cross arm to the respective blades for effecting simultaneous blade pitch changing motion in the same sense in response to longitudinal movement of said push-pull tube; a second push-pull member reciprocable within the push-pull tube and locked to rotate therewith; a rigid arm extending laterally from said second push-pull member; a link pivotally connecting the outer end of said arm to said cross arm at a point between one end of the cross arm and its pivot axis for effecting simultaneous blade pitch changing motion in an opposite sense in response to longitudinal movement of said second push-pull member within the push-pull tube; and pilot controlled means operably connected to said second push-pull member for cyclically reciprocating it with relation to the push-pull tube during their rotation, and for selectively relating the high and low points of the reciprocating movement to the relative positions of the blades in their rotational path of travel.

4. In a helicopter, a hollow drive shaft; rotor blades; means mounting said blades on said shaft to rotate therewith and including a spanwise pivot axis for each blade affording pitch changing blade movement; a push-pull tube reciprocable within the hollow drive shaft and locked to rotate therewith; a rigid cross arm centrally pivoted on said push-pull tube on an axis normal to the rotational axis of the tube; links pivotally connecting the opposite ends of said cross arm to the respective blades for effecting simultaneous blade pitch changing motion in the same sense in response to longitudinal movement of said push-pull tube; a second push-pull member reciprocable within the push-pull tube and locked to rotate therewith; a rigid arm extending laterally from said second push-pull member; a link pivotally connecting the outer end of said arm to said cross arm at a point between one end of the cross arm and its pivot axis for effecting simultaneous blade pitch changing motion in an opposite sense in response to longitudinal movement of said second push-pull member within the push-pull tube; pilot controlled means operably connected with the push-pull tube for selectively changing the longitudinal position thereof with relation to said drive shaft during their rotation; and pilot controlled means operably connected to each of the push-pull members for reciprocating the second push-pull member with relation to the push-pull tube during the rotation of both.

5. In a helicopter, a hollow drive shaft; rotor blades; means mounting said blades on said shaft to rotate therewith and including a spanwise pivot axis for each blade affording pitch changing blade movement; a push-pull tube reciprocable within the hollow drive shaft and locked to rotate therewith; a rigid cross arm centrally pivoted on said push-pull tube on an axis normal to the rotational axis of the tube; links pivotally connecting the opposite ends of said cross arm to the respective blades for effecting simultaneous blade pitch changing motion in the same sense in response to longitudinal movement of said push-pull tube; a second push-pull member reciprocable within the push-pull tube and locked to rotate therewith; a rigid arm extending laterally from said second push-pull member; a link pivotally connecting the outer end of said arm to said cross arm at a point between one end of the cross arm and its pivot axis for effecting simultaneous blade pitch changing motion in an opposite sense in response to longitudinal movement of said second push-pull member within the push-pull tube; a yoke connected to said push-pull tube for transmitting an axial force thereto during tube rotation; pilot operable means connected to said yoke; means connected to the drive shaft and to said second push-pull member for reciprocating the second push-pull member with relation to the push-pull tube during rotation of said drive shaft.

6. In a helicopter, a hollow rotor drive shaft; rotor blades extending radially outward therefrom; means respectively connecting the blades to the shaft to rotate therewith and including a spanwise axis for each blade affording pitch changing blade movement; a rigid push-pull rod mounted concentrically within said drive shaft for longitudinal reciprocating motion with relation thereto; means connecting the push-pull rod and drive shaft to force them to rotate together; means operably connecting the push-pull rod to each of the blades for converting axial reciprocating movement of the rod to simultaneous cyclic blade pitch changing movement in opposite directions; a pilot tiltable push-pull rod reciprocating member; means including a universal joint connecting said member concentrically with the drive shaft to rotate therewith; means connecting the rod with the rod reciprocating member at a point eccentric to the rotational axis of the drive shaft; and pilot controlled means connected to the rod reciprocating member for tilting it into various planes during its rotation with the drive shaft and rod.

7. In a helicopter, a hollow rotor drive shaft; rotor blades extending radially outward therefrom; means respectively connecting the blades to the shaft to rotate therewith and including a spanwise axis for each blade affording pitch changing blade movement; a rigid push-pull rod mounted concentrically within said drive shaft for longitudinal reciprocating motion with relation thereto; means connecting the push-pull rod and drive shaft to force them to rotate together; means operably connecting the push-pull rod to each of the blades for converting axial reciprocating movement of the rod to simultaneous cyclic blade pitch changing movement in opposite directions; a push-pull rod reciprocating member having a rigid arm projecting laterally therefrom; means including a universal joint connecting the member concentrically with the drive shaft and constraining the member to rotate therewith; a laterally projecting arm carried by the push-pull rod and lying in the same plane as the arm on the rod reciprocating member; a link having its opposite ends pivotally connected to the respective outer ends of the two arms; and pilot controlled means connected with the rod reciprocating member for tilting it into selected positions of non-alignment with the rotational axis of the drive shaft.

CHARLES M. SEIBEL.

REFERENCES CITED

The following references are of record in the file of this patent:

UNITED STATES PATENTS

| Number | Name | Date |
|---|---|---|
| 1,052,378 | Porter | Feb. 4, 1913 |
| 2,045,623 | Wilford | June 30, 1936 |
| 2,150,129 | Pecker | Mar. 7, 1939 |
| 2,256,635 | Young | Sept. 23, 1941 |
| 2,399,076 | Trice | Apr. 23, 1946 |
| 2,455,866 | Kaman | Dec. 7, 1948 |
| 2,481,750 | Hiller et al. | Sept. 13, 1949 |
| 2,499,314 | Hunt | Feb. 28, 1950 |
| 2,511,687 | Andrews | June 13, 1950 |

FOREIGN PATENTS

| Number | Country | Date |
|---|---|---|
| 5,459 | Great Britain | Oct. 24, 1912 |